United States Patent Office 3,168,903
Patented Feb. 9, 1965

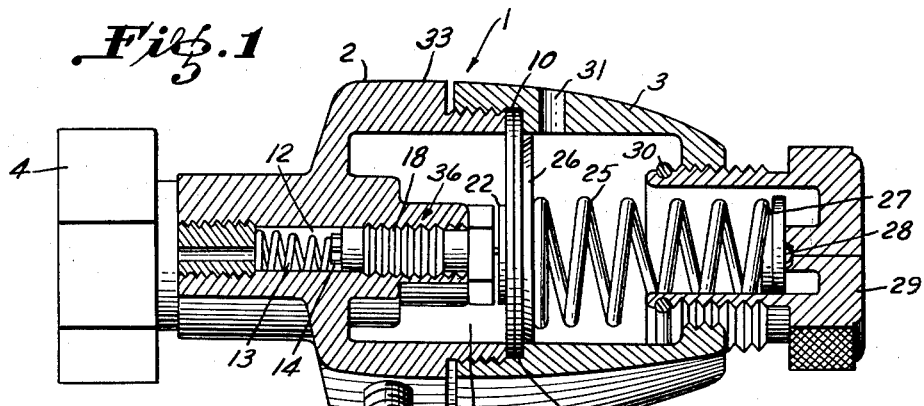

3,168,903
FLUID PRESSURE REGULATOR HAVING
MEANS TO REDUCE HUM
David S. Pearl, 1344 NE. 13th Ave.,
Fort Lauderdale, Fla.
Filed Aug. 15, 1960, Ser. No. 49,517
12 Claims. (Cl. 137—505.42)

This invention relates to a fluid pressure regulator for regulating the output pressure of a variable pressure source.

Fluid in a gaseous phase, such as acetylene gas or oxygen gas, taken from a variable pressure source, such as a tank containing said gaseous fluid under pressure, in many cases must be delivered to externally positioned apparatus which requires the fluid gas under constant pressure, such as, for example, a cutting or welding or brazing torch. Fluid pressure regulators are designed to be so used.

The fluid pressure regulator of this invention converts an inlet fluid gas, such as, for example, oxygen gas or acetylene gas, taken from an external variable pressure source such as a tank confining the gas under pressure therein to a predetermined constant pressure at the outlet. An adjusting screw is threadedly mounted in the regulator casing, and the position of this adjusting screw determines the compression of a loading or pressure adjusting spring which applies a force to a diaphragm. This force is predetermined in accordance with the distance through which the adjusting screw passes into the casing and depends solely upon the position assumed by the adjusting screw after passing through said distance. In the operation of the regulator, a substantially constant predetermined outlet gas pressure is obtained by the interaction of opposing forces produced by the pressure adjusting spring against the combined forces of the gas under pressure within the outlet chamber and the force of the valve closing spring acting to position the diaphragm, which, in turn, positions the valve plug through the valve stem. The force exerted by the gas in the outlet chamber is the only variable force exerted upon the diaphragm during operation of the regulator, and, therefore, diaphragm movement depends only upon gas pressure change in the outlet chamber. Each of a plurality of predetermined fluid gas delivery pressures can be maintained substantially constant merely by holding, or maintaining, the adjusting screw at a predetermined position in the casing, said predetermined position determining the compression of the loading or pressure adjusting spring which, in turn, applies a predetermined force at that position to the diaphragm. Change in force of the gas under pressure in the outlet chamber imparts movement to the diaphragm which, in turn, varies the opening at the valve to regulate the pressure in the outlet chamber. If the force of the gas under pressure in the outlet chamber be less than the force exerted by the adjusting spring on the diaphragm, the diaphragm causes the valve stem to move to open the valve and allow gas under pressure to pass from the inlet passage to the outlet chamber. Thusly is the gas pressure in the outlet chamber maintained at a substantially constant value.

Prior art devices have been subjected to an objectionable hum during operation. The flow of high pressure inlet fluid along the valve closing spring and the turbulence of the gas expanding to a lower pressure at the valve plug and seat tends to establish sonic vibrations in the plug carrier and also in the valve closing spring. Prior art devices have attempted to eliminate this hum by the use of a cylindrically shaped valve closing spring having a large length to diameter ratio, viz. about 4.25 to 1, which tends to buckle when lightly compressed so that some of the valve closing spring convolutions will contact the walls of the inlet passage and thereby suppress the tendency of the movable valve element to hum. This method of reducing hum causes the valve closing spring to be subjected to a great amount of wear due to the constant frictional force exerted upon the convolutions contacting the inlet passage walls.

Because of the patentably novel structure of my fluid pressure regulator which includes a frustoconically shaped valve closing spring of predetermined dimensional characteristics with respect to the portion of the carrier element positioned within the adapter when the valve is in the closed position, said frustoconically shaped valve closing spring having a maximum outside diameter which is less than the diameter of the inlet passage by a predetermined amount, and a carrier slideably mounted in an adapter to form a slip-in fit, the diameter of the carrier through the flutes and the diameter of the adapter differing in size by a predetermined amount when said valve is in the closed position, hum is eliminated at the valve closing spring and at the valve seat and throughout the regulator generally during operation with simultaneous elimination of frictional wear at the valve closing spring and the carrier flutes.

An object of this invention is to provide a valve closing spring which eliminates hum.

Another object of this invention is to provide a fluid pressure regulator which eliminates hum throughout under operating conditions.

A further object of this invention is to provide a valve closing spring which eliminates hum and unnecessary wear of any of its component parts.

Other objects and features will become apparent from the following detailed description of the preferred embodiment of my invention.

FIGURE 1 is an elevational perspective view partially in section of my fluid pressure regulator, the valve therein being in closed position.

FIGURE 2 is a longitudinal cross-sectional view of the fluid pressure regulator of this invention.

FIGURE 3 is a cross-sectional view of the fluid pressure regulator of this invention taken along the line 3—3 in FIGURE 2.

More specifically, there is provided regulator assembly 1 having body 2 fitted within threaded bonnet 3 forming a casing 33. The regulator assembly 1 is connected to a source of variable high pressure fluid (not shown), such as a tank, by a metallic compression nut 4. Body, 2, bonnet 3, compresion nut 4 and snap ring 5 are preferably made from a metal which is not easily oxidized, such as brass. The collar of compression nut 4 works against metallic snap ring 5. Snap ring 5 is seated in a groove 6 machined into the integral inlet neck 7 of regulator body 2. A filter 8 is mounted within filter holder 9 at the high pressure inlet, and the filter holder 9 is threadedly mounted into inlet neck 7.

Regulator body 2 and bonnet 3 secure diaphragm 10 which is fixedly positioned within the casing and extends across said casing forming two separate compartments. Diaphragm 10 can be made, for example, from an impregnated fabric. Washer 11 is secured within said casing by body 2 and bonnet 3, as clearly shown in the appended drawings.

Inlet passage 12 is in body 2, and frustoconically shaped valve closing spring 13 is positioned therewithin at its upstream end. The bottom or largest diameter portion of said frustoconically shaped valve closing spring 13 abuts inlet neck 7 and is positioned about and held in place by cylindrical projection 34 thereof. The top or smallest diameter portion of said frustoconically shaped valve closing spring 13 is attached to the movable carrier element portion of valve 36 which is downstream of said valve closing spring 13 and within inlet passage 12, said valve 36 including a carrier element 14 having integral therewith circumferentially spaced and axially positioned longitudinal flutes 15, valve plug 16 and vents 17 located at the rear of recess 35 in carrier 14 for holding the material of valve plug 16, so that any pressure developed while forcing the plug material into its recess is relieved through said vents 17. The valve also contains a stationary valve seat member 37. Flutes 15 form passageways 38 through which the incoming gas is supplied. Carrier 14 is slideably mounted within adapter 18 to form a slip-in fit, the greatest diameter of carrier 14 taken across flutes 15 being from about 0.002 inch to about 0.005 inch less than the diameter of adapter 18. This slip-in fit will substantially eliminate any carrier movement caused by turbulence at the valve plug and seat.

The ratio of the outside diameter of the bottom of valve closing spring 13 to the outside diameter of the top of said valve closing spring is about 1.4 to about 1. The ratio of the length of valve closing spring 13 when valve 36 is in the closed position to the outside diameter of the top of said valve closing spring is about 2 to about 1. The ratio of the length of the portion of carrier 14 within adapter 18 when the valve is in the closed position to the outside diameter of the top of valve closing spring 13 is about 3.5 to about 1. The diameter of inlet passage 12 is greater than the diameter of the bottom of valve closing spring 13, and said valve closing spring 13 is never in contact with the walls of inlet passage 12 at any time. The ratio of the diameter of said inlet passage 12 to the outside diameter of the bottom of said valve closing spring is about 1.3 to about 1.

Bore 39, preferably cylindrically shaped, of adapter 18 terminates with end wall 19 in the center of which is machined valve seat 37 and outlet opening 20. Said adapter body terminates with hexagonally shaped head 40, as clearly shown in the appended drawing. Valve stem 21 extends through outlet opening 20 and rests against wearing plate 22 on the gas side of diaphragm 10, said wearing plate being attached thereto as by vulcanizing or by cementing. Head 40 of adapter 18 limits the maximum travel of diaphragm 10 in the direction tending to open regulator valve 36.

Outlet opening 20 leads into outlet chamber 23 where the fluid is collected at reduced constant pressure and is then passed to outlet 24.

Positioned in bonnet 3 is helical pressure adjusting spring, or loading spring, 25 positioned about, at one end portion, projection 60 of pressure plate 26 and against surface 62 of said pressure plate 26. Pressure adjusting spring 25, at its other end portion is positioned about projection 64 of bearing plate 27 and against surface 66 of said bearing plate 27. Both end surfaces of pressure adjusting spring are preferably ground flat and attached to surface 62 of pressure plate 26 and to surface 66 of bearing plate 27, respectively, as by vulcanizing or by cementing. Bearing plate 27 has projecting from its surface 68, at the central portion thereof, the preferably hemispherically shaped member 28 which is received in recess 70 of adjusting screw 29. The annularly extending flange 72 of adjusting screw 29 contacts bearing plate 27 at its surface 68, as shown in the appended drawings. Adjusting screw 29 is threadedly received in the end portion of bonnet 3, and removal therefrom is prevented by snap ring 30, as shown in the appended drawings. Holes 31 through the wall of bonnet 3 vent said bonnet to the atmosphere.

The fluid pressure regulator operates as follows: Pressure adjusting screw 29 is threadedly positioned at a predetermined position with respect to the bonnet 3 of casing 1 for a predetermined fluid gas delivery pressure, and thereby determines the compression of pressure adjusting spring 25 for said predetermined fluid gas delivery pressure, said adjusting spring 25 applying a force to diaphragm 10. High pressure gas enters the regulator passing through filter 8, into inlet passage 12, through and around valve closing spring 13, and through passageways 38 between flutes 15 within adapter 18. The inlet gas pressure is sensed by and indicated on a gauge (not shown), said gas pressure being sensed in passage 32 coextensive with inlet passage 12, as clearly shown in the appended drawing. The pressure of the gas flowing into outlet opening 20 is controlled by the variable annular opening between the rounded portion of seat 37 and the tapered end of valve plug 16 as in any plug type valve. A substantially constant predetermined outlet gas pressure is obtained by the interaction of opposing forces produced by the pressure adjusting spring 25 against the combined forces of the gas under pressure within outlet chamber 23 plus the force of the valve closing spring acting to position diaphragm 10, which, in turn, positions valve plug 16 through valve stem 21. For example, at a fixed predetermined position of adjusting screw 29 and, of course, a fixed predetermined pressure adjusting spring 25 compression force, the fluid delivery pressure will be fixed for that position of adjusting screw 29 and that compression of pressure adjusting spring 25. If the gas pressure be lower in chamber 23 than the predetermined gas delivery pressure, the force of said gas in outlet chamber 23 on diaphragm 10 is reduced and pressure adjusting spring 25 urges diaphragm 10 against stem 21 which backs valve plug 16 away from valve seat 37 thereby allowing a greater area for gas to flow under pressure into outlet opening 20 and thence into outlet chamber 23 to increase the gas in outlet chamber 23 and thereby to increase the gas pressure in the outlet chamber 23 to the predetermined gas delivery pressure desired.

Many alterations and changes may be made without departing from the spirit and scope of this invention which is set forth in the appended claims which are to be construed as broadly as possible in view of the prior art.

I claim:

1. A fluid pressure regulator for regulating the fluid output pressure of a variable fluid pressure source, comprising, in combination, a casing, said casing having an inlet passage and an outlet passage, a valve between said inlet and outlet passages, a flexible diaphragm fixedly positioned within said casing, said valve including a movable carrier element, stem means for moving said carrier element upon movement of said diaphragm, said stem means being attached to said carrier element and being in abutting relationship with said diaphragm, an adapter body member positioned in said inlet passage at its downstream end, said carrier element being movably positioned for at least a portion of its length in said adapter body and slideably fitted therein and said stem means extending through and beyond said adapter body, a frustoconically shaped valve closing spring positioned in said inlet passage at its upstream end, said frustoconically shaped valve closing spring being attached at its top portion to said carrier element, the ratio of the outside diameter of the top of said spring to the outside diameter of the bottom of said spring to the axial length of said spring to the length of the portion of the carrier element positioned within said adapter body when said valve is in the closed position being about 1 to about 1.4 to about 2 to about 3.5, whereby a substantially constant predetermined fluid output pressure of the outlet fluid is obtained while hum is suppressed without any wear of any component element.

2. A fluid pressure regulator for regulating the fluid output pressure of a variable fluid pressure source, comprising, in combination, a casing, said casing having an inlet passage and an outlet passage, a valve between said inlet and outlet passages, a flexible diaphragm fixedly positioned within said casing, said valve including a movable carrier element, stem means for moving said carrier element upon movement of said diaphragm, said stem means being attached to said carrier element and being in abutting relationship with said diaphragm, an adapter body member positioned in said inlet passage at its downstream end, said carrier element being movably positioned for at least a portion of its length in said adapter body and slideably fitted therein and said stem means extending through and beyond said adapter body, a frustoconically shaped valve closing spring positioned in said inlet passage at its upstream end, said frustoconically shaped valve closing spring being attached at its top portion to said carrier element, the ratio of the outside diameter of the top of said spring to the outside diameter of the bottom of said spring to the axial length of said spring to the length of the portion of the carrier element positioned within said adapter body when said valve is in the closed position being about 1 to about 1.4 to about 2 to about 3.5 and the ratio of the outside diameter of the bottom of said valve closing spring to the diameter of said inlet passage being about 1 to about 1.3, whereby a substantially constant predetermined fluid output pressure of the outlet fluid is obtained while hum is suppressed without any wear of any component element.

3. A fluid pressure regulator for regulating the fluid output pressure of a variable fluid pressure source, comprising, in combination, a casing, said casing having an inlet passage and an outlet passage, a valve between said inlet and outlet passages, a flexible diaphragm fixedly positioned within said casing, said valve including a movable carrier element, said carrier element including a plurality of circumferentially spaced flutes along the length of said carrier forming fluid passageways axial of said carrier element, stem means for moving said carrier element upon movement of said diaphragm, said stem means being attached to said carrier element and being in abutting relationship with said diaphragm, an adapter body member positioned in said inlet passage at its downstream end, said carrier element being movably positioned for at least a portion of its length in said adapter body and slideably fitted therein and said stem means extending through and beyond said adapter body, a frustoconically shaped valve closing spring positioned in said inlet passage at its upstream end, said frustoconically shaped valve closing spring being attached at its top portion to said carrier element, the ratio of the outside diameter of the top of said spring to the outside diameter of the bottom of said spring to the axial length of said spring to the length of the portion of the carrier element positioned within said adapter body when said valve is in the closed position being about 1 to about 1.4 to about 2 to about 3.5, the inner diameter of the bore of the adapter being from 0.002 inch to 0.005 inch greater than the greatest diameter of the carrier element across its flutes, whereby a substantially constant predetermined fluid output pressure of the outlet fluid is obtained while hum is suppressed without any wear of any component element.

4. A fluid pressure regulator for regulating the fluid output pressure of a variable fluid pressure source, comprising, in combination, a casing, said casing having an inlet passage and an outlet passage, a valve between said inlet and outlet passages, a flexible diaphragm fixedly positioned within said casing, said valve including a movable carrier element, said carrier element including a plurality of circumferentially spaced flutes along the length of said carrier forming fluid passageways axial of said carrier element, stem means for moving said carrier element upon movement of said diaphragm, said stem means being attached to said carrier element and being in abutting relationship with said diaphragm, an adapter body member positioned in said inlet passage at its downstream end, said carrier element being movably positioned for at least a portion of its length in said adapter body and slideably fitted therein and said stem means extending through and beyond said adapter body, a frustoconically shaped valve closing spring positioned in said inlet passage at its upstream end, said frustoconically shaped valve closing spring being attached at its top portion to said carrier element, the ratio of the outside diameter of the top of said spring to the outside diameter of the bottom of said spring to the axial length of said spring to the length of the portion of the carrier element positioned within said adapter body when said valve is in the closed position being about 1 to about 1.4 to about 2 to about 3.5, the ratio of the outside diameter of the bottom of said valve closing spring to the diameter of said inlet passage being about 1 to about 1.3 and the inner diameter of the bore of the adapter being from 0.002 inch to 0.005 inch greater than the greatest diameter of the carrier element across its flutes, whereby a substantially constant predetermined fluid output pressure of the outlet fluid is obtained while hum is suppressed without any wear of any component element.

5. A fluid pressure regulator for regulating the fluid output pressure of a variable fluid pressure source, comprising, in combination, a casing, said casing having an inlet passage and an outlet passage, a valve between said inlet and outlet passages, a flexible diaphragm fixedly positioned within said casing, said valve including a movable carrier element, stem means for moving said carrier element upon movement of said diaphragm, said stem means being attached to said carrier element and being in abutting relationship with said diaphragm, an adapter body member positioned in said inlet passage at its downstream end, said carrier element being movably positioned for at least a portion of its length in said adapter body and slideably fitted therein and said stem means extending through and beyond said adapter body, a frustoconically shaped valve closing spring positioned in said inlet passage at its upstream end, said frustoconically shaped valve closing spring being attached at its top portion to said carrier element, the ratio of the outside diameter of the top of said spring to the outside diameter of the bottom of said spring to the axial length of said spring to the length of the portion of the carrier element positioned within said adapter when said valve is in the closed position being about 1 to about 1.4 to about 2 to about 3.5, a pressure plate secured to said diaphragm on its side opposite said valve, a loading spring attached at one end to said pressure plate, a bearing plate attached to the other end of said loading spring and an adjusting screw threadedly mounted in said casing and abutting said bearing plate on its side opposite said loading spring to apply a force to said loading spring, whereby a substantially constant predetermined fluid output pressure of the outlet fluid is obtained while hum is suppressed without any wear of any component element.

6. A fluid pressure regulator for regulating the fluid output pressure of a variable fluid pressure source, comprising, in combination, a casing, said casing having an inlet passage and an outlet passage, a valve between said inlet and outlet passages, a flexible diaphragm fixedly positioned within said casing, said valve including a movable carrier element, stem means for moving said carrier element upon movement of said diaphragm, said stem means being attached to said carrier element and being in abutting relationship with said diaphragm, an adapter body member positioned in said inlet passage at its downstream end, said carrier element being movably positioned for at least a portion of its length in said adapter body and slideably fitted therein and said stem means extending through and beyond said adapter body, a frustoconically shaped valve closing spring positioned in said inlet passage at its upstream end, said frustoconically shaped valve closing spring being attached at its top portion to said carrier element, the ratio of the outside diameter of the top of said spring to the outside diameter of the bottom of said spring to the axial length of said spring to the length of the portion of the carrier element positioned within said adapter body when said valve is in the closed position being about 1 to about 1.4 to about 2 to about 3.5, the ratio of the outside diameter of the bottom of said valve closing spring to the diameter of said inlet passage being about 1 to about 1.3, a pressure plate secured to said diaphragm on its side opposite said valve, a loading spring attached at one end to said pressure plate, a bearing plate attached to the other end of said loading spring and an adjusting screw threadedly mounted in said casing and abutting said bearing plate on its side opposite said loading spring to apply a force to said loading spring, whereby a substantially constant predetermined fluid output pressure of the outlet fluid is obtained while hum is suppressed without any wear of any component element.

7. A fluid pressure regulator for regulating the fluid output pressure of a variable fluid pressure source, comprising, in combination, a casing, said casing having an inlet passage and an outlet passage, a valve between said inlet and outlet passages, a flexible diaphragm fixedly positioned within said casing, said valve including a movable carrier element, said carrier element including a plurality of circumferentially spaced flutes along the length of said carrier forming fluid passageways axial of said carrier element, stem means for moving said carrier element upon movement of said diaphragm, said stem means being attached to said carrier element and being in abutting relationship with said diaphragm, an adapter body member positioned in said inlet passage at the downstream end, said carrier element being movably positioned for at least a portion of its length in said adapter body and slideably fitted therein and said stem means extending through and beyond said adapter body, a frustoconically shaped valve closing spring positioned in said inlet passage at its upstream end, said frustoconically shaped valve closing spring being attached at its top portion to said carrier element, the ratio of the outside diameter of the top of said spring to the outside diameter of the bottom of said spring to the axial length of said spring to the length of the portion of the carrier element positioned within said adapter body when said valve is in the closed position being about 1 to about 1.4 to about 2 to about 3.5, the inner diameter of the bore of the adapter being from 0.002 inch to 0.005 inch greater than the greatest diameter of the carrier element across its flutes, a pressure plate secured to said diaphragm on its side opposite said valve, a loading spring attached at one end to said pressure plate, a bearing plate attached to the other end of said loading spring and an adjusting screw threadedly mounted in said casing and abutting said bearing plate on its side opposite said loading spring to apply a force to said loading spring, whereby a substantially constant predetermined fluid output pressure of the outlet fluid is obtained while hum is suppressed without any wear of any component element.

8. A fluid pressure regulator for regulating the fluid output pressure of a variable fluid pressure source, comprising, in combination, a casing, said casing having an inlet passage and an outlet passage, a valve between said inlet and outlet passages, a flexible diaphragm fixedly positioned within said casing, said valve including a movable carrier element, said carrier element including a plurality of circumferentially spaced flutes along the length of said carrier forming fluid passageways axial of said carrier element, stem means for moving said carrier element upon movement of said diaphragm, said stem means being attached to said carrier element and being in abutting relationship with said diaphragm, an adapter body member positioned in said inlet passage at the downstream end, said carrier element being movably positioned for at least a portion of its length in said adapter body and slideably fitted therein and said stem means extending through and beyond said adapter body, a frustoconically shaped valve closing spring positioned in said inlet passage at its upstream end, said frustoconically shaped valve closing spring being attached at its top portion to said carrier element, the ratio of the outside diameter of the top of said spring to the outside diameter of the bottom of said spring to the axial length of said spring to the length of the portion of the carrier element positioned within said adapter body when said valve is in the closed position being about 1 to about 1.4 to about 2 to about 3.5, the ratio of the outside diameter of the bottom of said valve closing spring to the diameter of said inlet passage being about 1 to about 1.3 and the inner diameter of the bore of the adapter being from 0.002 inch to 0.005 inch greater than the greatest diameter of the carrier element across its flutes, a pressure plate secured to said diaphragm on its side opposite said valve, a loading spring attached at one end to said pressure plate, a bearing plate attached to the other end of said loading spring and an adjusting screw threadedly mounted in said casing and abutting said bearing plate on its side opposite said loading spring, whereby a substantially constant predetermined fluid output pressure of the outlet fluid is obtained while hum is suppressed without any wear of any component element.

9. A fluid pressure regulator for regulating the fluid output pressure of a variable fluid pressure source, comprising, in combination, a casing, said casing having an inlet passage and an outlet passage, a valve between said inlet and outlet passages, a flexible diaphragm fixedly positioned within said casing, said valve including a movable carrier element, said movable carrier element including a conical valve plug at its downstream end and a plurality of flutes forming fluid passageways axial of said carrier element, stem means for moving said carrier element upon movement of said diaphragm, said stem means being attached to said carrier element and being in abutting relationship with said diaphragm, an adapter body member positioned in said inlet passage at the downstream end, said carrier element being movably positioned for at least a portion of its length in said adapter body and slideably fitted therein and said stem means extending through and beyond said adapter body, a frustoconically shaped valve closing spring positioned in said inlet passage at its upstream end, said frustoconically shaped valve closing spring being attached at its top portion to said carrier element, the ratio of the outside diameter of the top of said spring to the outside diameter of the bottom of said spring to the axial length of said spring to the length of the portion of the carrier element positioned within said adapter body when said valve is in the closed position being about 1 to about 1.4 to about 2 to about 3.5, whereby a substantially constant predetermined fluid output pressure of the outlet fluid is obtained while hum is suppressed without any wear of any component element.

10. A fluid pressure regulator for regulating the fluid output pressure of a variable fluid pressure source, comprising, in combination, a casing, said casing having an inlet passage and an outlet passage, a valve between said inlet and outlet passages, a flexible diaphragm fixedly positioned within said casing, said valve including a movable carrier element, said movable carrier element including a conical valve plug at its downstream end and a plurality of flutes forming fluid passageways axial of said carrier element, stem means for moving said carrier element upon movement of said diaphragm, said stem means being attached to said carrier element and being in abutting relationship with said diaphragm, an adapter body member positioned in said inlet passage at the downstream end, said carrier element being movably positioned for at least a portion of its length in said adapter body and slideably fitted therein and said stem means extending through and beyond said adapter body, a frustoconically shaped valve closing spring positioned in said inlet passage at its upstream end, said frustoconically shaped valve closing spring being attached at its top portion to said carrier element, the ratio of the outside diameter of the top of said spring to the outside diameter of the bottom of said spring to the axial length of said spring to the length of the portion of the carrier element positioned within said adapter body when said valve is in the closed position about 1 to about 1.4 to about 2 to about 3.5 and the ratio of the outside diameter of the bottom of said valve closing spring to the diameter of said inlet passage being about 1 to about 1.3, whereby a substantially constant predetermined fluid output pressure of the outlet fluid is obtained while hum is suppressed without any wear of any component element.

11. A fluid pressure regulator for regulating the fluid output pressure of a variable fluid pressure source, comprising, in combination, a casing, said casing having an inlet passage and an outlet passage, a valve between said inlet and outlet passages, a flexible diaphragm fixedly positioned within said casing, said valve including a movable carrier element, said movable carrier element including a conical valve plug at its downstream end and a plurality of flutes forming fluid passageways axial of said carrier element, stem means for moving said carrier element upon movement of said diaphragm, said stem means being attached to said carrier element and being in abutting relationship with said diaphragm, an adapter body member positioned in said inlet passage at the downstream end, said carrier element being movably positioned for at least a portion of its length in said adapter body and slideably fitted therein and said stem means extending through and beyond said adapter body, a frustoconically shaped valve closing spring positioned in said inlet passage at its upstream end, said frustoconically shaped valve closing spring being attached at its top portion to said carrier element, the ratio of the outside diameter of the top of said spring to the outside diameter of the bottom of said spring to the axial length of said spring to the length of the portion of the carrier element positioned within said adapter body when said valve is in the closed position being about 1 to about 1.4 to about 2 to about 3.5 and the inner diameter of the bore of the adapter being from 0.002 inch to 0.005 inch greater than the greatest diameter of the carrier element across its flutes, whereby a substantially constant predetermined fluid output pressure of the outlet fluid is obtained while hum is suppressed without any wear of any component element.

12. A fluid pressure regulator for regulating the fluid output pressure of a variable fluid pressure source, comprising, in combination, a casing, said casing having an inlet passage and an outlet passage, a valve between said inlet and outlet passages, a flexible diaphragm fixedly positioned within said casing, said valve including a movable carrier element, said movable carrier element including a conical valve plug at its downstream end and a plurality of flutes forming fluid passageways axial of said carrier element, stem means for moving said carrier element upon movement of said diaphragm, said stem means being attached to said carrier element and being in abutting relationship with said diaphragm, an adapter body member positioned in said inlet passage at the downstream end, said carrier element being movably positioned for at least a portion of its length in said adapter body and slideably fitted therein and said stem means extending through and beyond said adapter body, a frustoconically shaped valve closing spring positioned in said inlet passage at its upstream end, said frustoconically shaped valve closing spring being attached at its top portion to said carrier element, the ratio of the outside diameter of the top of said spring to the outside diameter of the bottom of said spring to the axial length of said spring to the length of the portion of the carrier element positioned within said adapter body when said valve is in the closed position being about 1 to about 1.4 to about 2 to about 3.5, the ratio of the outside diameter of the bottom of said valve closing spring to the diameter of said inlet passage being about 1 to about 1.3 and the inner diameter of the bore of the adapter being from 0.002 inch to 0.005 inch greater than the greatest diameter of the carrier element across its flutes, whereby a substantially constant predetermined fluid output pressure of the outlet fluid is obtained while hum is suppressed without any wear of any component element.

References Cited in the file of this patent
UNITED STATES PATENTS

| | | |
|---|---|---|
| 2,202,313 | Grove | May 28, 1940 |
| 2,747,607 | Matasovic | May 29, 1956 |
| 2,768,643 | Acomb | Oct. 30, 1956 |
| 2,854,207 | Hammon | Sept. 30, 1958 |